March 2, 1965         O. FISCHER         3,171,337
PHOTOGRAPHIC CAMERA WITH AUXILIARY LIGHT SOURCE AND
AUTOMATIC CONTROL MEANS FOR THE LATTER
Filed Sept. 7, 1962         3 Sheets-Sheet 1

INVENTOR
OSKAR FISCHER
By Blum, Moscovitz,
Friedman and Blum
Att'ys.

March 2, 1965  O. FISCHER  3,171,337
PHOTOGRAPHIC CAMERA WITH AUXILIARY LIGHT SOURCE AND
AUTOMATIC CONTROL MEANS FOR THE LATTER
Filed Sept. 7, 1962  3 Sheets-Sheet 2

INVENTOR
OSKAR FISCHER
By Blum, Moscovitz,
Friedman and Blum
Att'ys.

March 2, 1965 O. FISCHER 3,171,337
PHOTOGRAPHIC CAMERA WITH AUXILIARY LIGHT SOURCE AND
AUTOMATIC CONTROL MEANS FOR THE LATTER
Filed Sept. 7, 1962 3 Sheets-Sheet 3

INVENTOR
OSKAR FISCHER
BY Blum, Moscovitz,
Friedman and Blum
Att'ys.

United States Patent Office 3,171,337
Patented Mar. 2, 1965

3,171,337
PHOTOGRAPHIC CAMERA WITH AUXILIARY LIGHT SOURCE AND AUTOMATIC CONTROL MEANS FOR THE LATTER
Oskar Fischer, Volkmarode, near Braunschweig, Germany, assignor to Voigtländer A.G., Braunschweig, Germany, a corporation of Germany
Filed Sept. 7, 1962, Ser. No. 221,986
Claims priority, application Germany, Sept. 30, 1961, V 21,392
5 Claims. (Cl. 95—11.5)

This invention relates to photographic cameras having auxiliary light sources either permanently or disengageably associated therewith, and more particularly to novel means for inhibiting energization of the auxiliary light source, either directly or through inhibiting actuation of the shutter release, which controls such energization, when the distance of the picture subject from the camera is such that it cannot be illuminated adequately by the auxiliary light source.

Many camera exposures made using auxiliary light sources, such as flashbulb devices or electronic light sources, are defective due to the fact that the distance of the picture subject from the camera is so great that the object cannot be illuminated adequately by the auxiliary light source. In cameras equipped with either permanently connected or disengageably connected auxiliary light sources, it is not always feasible to determine, in advance of taking a photograph using the illumination provided by the auxiliary light source, whether the picture subject will be illuminated adequately by the auxiliary light source.

In accordance with the present invention, defective exposures of this type are prevented by novel means preventing closure of the energizing circuit of the auxiliary light source whenever picture subjects are so distant from the camera that they cannot be illuminated adequately by the auxiliary light source. This means preferably is coupled, with the aid of suitable intermediate components, with the range or distance setting means of the camera objective for operation in accordance with the distance setting of the objective.

Such means may be effective to open a normally closed additional switch in series in the energizing circuit, or alternatively to inhibit actuation of the shutter release and thereby prevent closing of the usual normally open switch in series in the energizing circuit and closed responsive to actuation of the shutter release.

In further accordance with the invention, an adjustable numerical index coupling is provided between the range setting means of the objective and the diaphragm setting means, so as to alter the relative interrelation of these setting means in accordance with the numerical index of the auxiliary light source. Thus, the diaphragm opening thereby is set in relation to the distance of the picture subject and taking into consideration the numerical index of the auxiliary light source. Where the reading of an exposure meter falls in the range of inadequate ambient illumination, automatic means utilizing a scanning device or the like, or manual adjustment of a range setting device, can be devised to effect the automatic control of the operation of the auxiliary light source. In either case, the result attained is a limiting distance value commensurate with the fully open position of the diaphragm and taking into consideration the numerical index of the auxiliary light source, and this limiting distance setting cannot be exceeded without preventing operation of the auxiliary light source.

In one embodiment of the invention, an additional and normally closed switching means is provided in the energizing circuit of the auxiliary light source and arranged to be opened when the diaphragm setting means is moved to a position just beyond the fully open position of the diaphragm, thus to prevent closing of the energizing circuit of the auxiliary light source. In this embodiment, special coupling means can be provided in the drive connecting the distance setting device and the diaphragm setter so as to provide for a certain limited additional movement of the diaphragm setter beyond a position corresponding to the fully open condition of the diaphragm. Thus, when the diaphragm has attained its fully open position, an exposure can be made but, upon further movement of the range or distance setting device in a direction to open the diaphragm further, the switching device or switch in the energizing circuit of the auxiliary light source is opened or maintained open so that the auxiliary light source cannot be energized.

As a refinement of this embodiment of the invention, the additional coupling means may be so arranged that, when the range setting device is shifted into a position corresponding to a more than fully opened position of the diaphragm, actuation of the shutter release is inhibited.

For an understanding of the principles of the invention, reference is made to the following description of typical embodiments thereof as illustrated in the accompanying drawings. In the drawings:

FIG. 1 is a somewhat schematic illustration of the principles of the invention, the arrangement illustrated in FIG. 1 including a normally closed additional switch in the energizing circuit of the auxiliary light source and which is opened in the range beyond the fully open position of the diaphragm and where the picture subject is too far removed for adequate illumination by the auxiliary light source;

Figure 1:
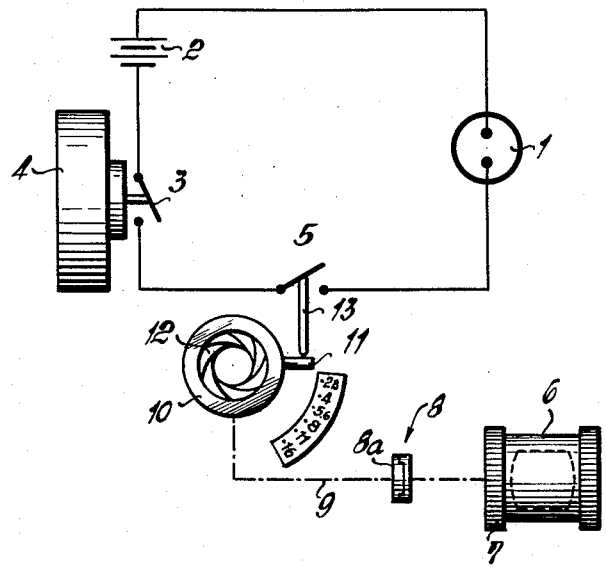

Referring to FIG. 1, an auxiliary light source 1 which may be permanently or disengageably coupled with a camera is illustrated as having an energizing circuit including a potential source 2, such as a battery, and a normally open switch 3 which is automatically closed upon release of a shutter 4. Thus, with other conditions being equal, when the shutter 4 is released by actuation of the usual shutter release means, the auxiliary light source 1 is automatically energized. A normally closed switch 5 is also provided in the energizing circuit for auxiliary light source 1, and is in series with the auxiliary light source and with normally open switch 3. This switch 5 is designed to be opened whenever the picture subject is so far from the camera that it cannot be illuminated adequately by auxiliary light source 1.

An objective 6 is illustrated, in the arrangement of FIG. 1, as having a range or distnace setting device 7 connected to a coupling 8. Coupling 8 is provided to interpose, between range setting device 7 and a coupling 9, a factor or relative adjustment corresponding to the numerical index of auxiliary light source 1. Coupling component 9 connects an adjustable coupling component 8a to the setting ring 10 of a diaphragm 11.

Setting ring 10 has a radially projecting lug 11, which may be a lever or the like, which is engageable with an operator 13 in such a manner that, when setting ring 10 is adjusted in a diaphragm opening direction to a position beyond the fully open position of the diaphragm, operator 13 will open switch 5. In effect, ring 10 and lug or projection 11 can travel through a limited range beyond the fully open position of the diaphragm and corresponding, at the most, to one degree of opening of the diaphragm. During this further limited movement, operator 13 will open switch 5.

Thus, where the distance of a picture subject from the camera is so great that the subject cannot be illuminated adequately by auxiliary light source 1, the energizing circuit for the auxiliary light source cannot be completed. While lug or projection 11 is illustrated as formed on diaphragm setting ring 10, it should be understood that it could just as well be connected with coupling component 9 or with part 8a of coupling 8 used to set the relation of the parts in accordance with the particular numerical index of auxiliary light source 1.

Figure 2:
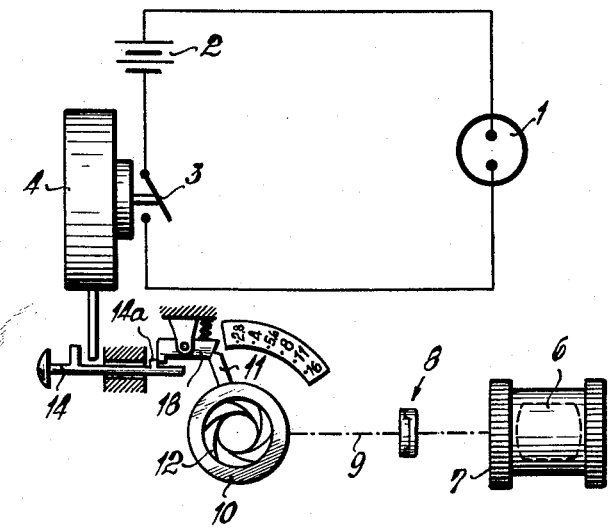
FIG. 2 is a view, similar to FIG. 1, illustrating an arrangement in which actuation of the shutter release is blocked when the distance of the picture subject from the camera is too great for adequate illumination of the object by the auxiliary light source.

In the arrangement shown in FIG. 2, parts which are identical with those shown in FIG. 1 have been given the same reference characters. In this arrangement, the switch 5 in the energizing circuit for the auxiliary light source 1 is omitted, but range or distance setting ring 7 of objective 6 is again coupled to diaphragm setting ring 10 through the medium of numerical index coupling 8, and diaphragm setting ring 10 is provided with lug or projection 11 which projects into the displacement range of a shutter release key 14. As in the arrangement of FIG. 1, diaphragm adjusting ring 10 and its lug 11 can be moved through one diaphragm position beyond the fully open position of the diaphragm.

At the limit of such excess movement of ring 10, lug 11 enters into the path of movement of shutter release key 14, or more particularly, it comes into contact with a pawl 18 which is displaced into the path of movement of shutter release key 14. As best seen in FIG. 2, pawl 18, upon engagement by lug or projection 11, is biased against the force of a biasing spring so as to extend into the path of movement of a projection or lug 14a on shutter release key 14. Thus, shutter release key 14 cannot be operated in a direction to release the shutter whenever the distance of a picture subject from the camera is such that the subject cannot be adequately illuminated by the auxiliary light source 1. As release key 14 cannot be actuated, switch 3 cannot be closed.

Figure 3:
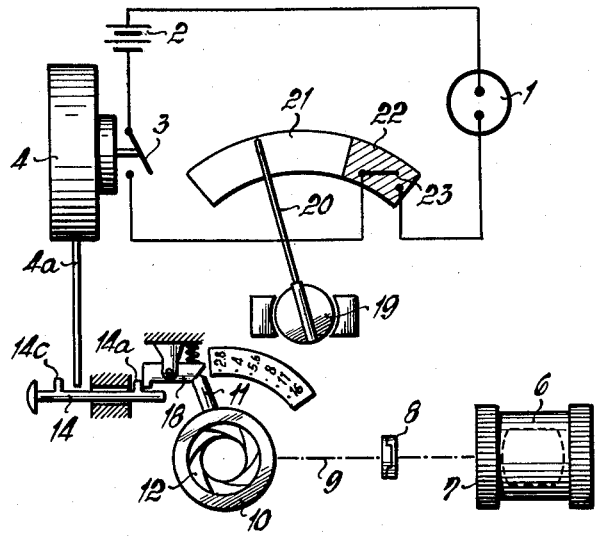
FIG. 3 is a schematic illustration, generally corresponding to FIG. 2, and illustrating a special switch device operable responsive to movement of the exposure meter indicator over its scale into the range of inadequate ambient illumination.

In the embodiment of the invention shown in FIG. 3, the moving coil instrument 19 of an exposure meter is illustrated as having an indicator 20 movable relative to a scale having a first range 21, representing values of ambient light adequate for proper exposures, and a second range 22, consecutive with the range 21, and representing values of ambient light inadequate for exposure. Within range 22, there is mounted a switch or the like 23 included in the energizing circuit for auxiliary light source 1. This circuit further includes battery 2 and normally open switch 3 controlled by the shutter 4 of the camera and closed when the shutter is released. The switch 23, when indicator 20 is within range 22 of inadequate ambient illumination, is closed either directly by indicator 20 or with the aid of suitable gears or the like connected with the indicator or controlled by it, such as, for example, a scanning indicator or the like for indicator 20.

The other elements of the arrangement shown in FIG. 3 are identical with the corresponding elements shown in the arrangement of FIG. 2. Thus, auxiliary light source 1 is activated only when the ambient illumination is insufficient for any exposure. However, should the setting of diaphragm 12, which is coupled with range setting means 7 through adjusting coupling 8 for the numerical index value of auxiliary light source 1, be at or above its maximum opening, release of shutter 4 is prevented in the same manner as described in connection with the arrangement of FIG. 2. It will be appreciated that the arrangement of FIG. 3 could be modified in such a manner that when indicator 20 is in range 21 of adequate ambient illumination, lug 11 projecting from diaphragm setting ring 10 cannot move beyond the fully open position of the diaphragm 12 so that, in this case, the shutter 4 may be released.

Figure 4:
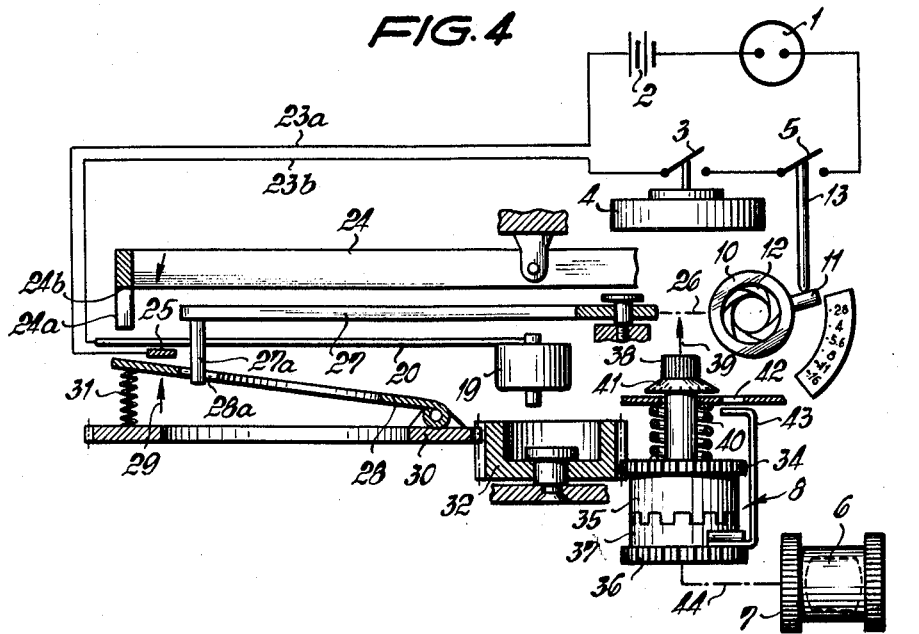
FIG. 4 is a part schematic and part sectional view of a camera having an automatic scanning device and which is operatively associated with the circuit controlling arrangement schematically illustrated in FIG. 1.

FIG. 4 illustrates a type of design wherein an additional switch is provided in the energizing circuit of auxiliary light source 1 so as to prevent energization of the auxiliary light source when the distance between the picture subject and the camera is too great to allow of adequate illumination of the picture subject by the auxiliary light source. The embodiment of the invention shown in FIG. 4 includes a pivotally mounted yoke 24 which has a lug 24a spatially correlated with the range 22 (FIG. 3) of inadequate ambient illumination of the scale over which exposure meter indicator 20 moves. When indicator 20 is within range 22, lug 24a will clamp indicator 20 against a clamping surface 25.

The diaphragm setting device 10 for diaphragm 12 is actuated by gearing schematically indicated at 26 and operated by a scanning indicator 27 which is released, to scan the position of indicator 20, immediately before the shutter is released. Scanning element 27 is provided with a lug 27a which may project into the path of movement of a lug 28a extending radially inwardly from a ring 28 which is pivoted on a rotatable ring 30 for movement about an axis parallel to and spaced from a diameter of ring 30. A spring 31 biases ring 28 outwardly from ring 30 in the direction of the arrow 29. By means of a pinion or the like 32, geared ring 30 is coupled with a numerical index coupling 8 comprising a clutch including a first jaw 35 which is movable with a gear 34 meshing with the gear or pinion 32, and a second jaw 37 movable with a gear 36. By means of a knob 38, jaw 35 may be moved axially upwardly, as viewed in FIG. 4, to disengage jaw 37 without disengaging gears 32 and 34, the two jaws normally being maintained in engagement by means of a compression spring 40. The direction of such upward movement is indicated by the arrow 39. When jaw 35 is thus moved upwardly, the relative angular relation of jaws 35 and 37 may be adjusted, in accordance with the numerical index of auxiliary light source 1, by utilizing a scale 41 on knob 38 and which cooperates with an indicator 43 visible through a window or opening 42. Indicator 43 is secured to and movable with gear 36. The lower jaw 37 of coupling 8 is connected, by gearing schematically indicated at 44, with range setting means 7 of objective lens 6.

As in the arrangement of FIG. 1, auxiliary light source 1 is connected in series with current source 2 and normally closed switch 5 which is opened, through the medium of an operator 13, whenever lug 11 of diaphragm setter 10 moves through a limited range beyond the fully open position of the diaphragm. There is further included in the energizing circuit of auxiliary light source 1 a pair of conductors 23a and 23b, one of which is connected to the exposure meter indicator 20 and the other to the clamping surface 25.

The arrangement of FIG. 4 operates as follows. When the shutter release is actuated, yoke 24 is swung counterclockwise in the direction of the arrow 45 and, if indicator 20 is then positioned in range 22 of inadequate ambient illumination, lug 24a of yoke 24 will contact indicator 20 and clamp it against the surface 25. This also electrically interconnects conductors 23a and 23b. Furthermore, ring 28 occupies the position shown in FIG. 4 so that scanning element 27, which is released just before the shutter is released, has its pin 27a positioned in the path of movement of lug 28a of ring 28 so that the setting of diaphragm 12, which is controlled by scanning element 27, is controlled in accordance with the relative position of rotatable ring 30. This relative position of ring 30 is adjusted in accordance with the range setting of objective lens 7 as modified by numerical index coupling 8. Thus, diaphragm 12 is adjusted in accordance with the distance or range setting of objective 6.

If the distance of the picture subject from the objective lens is too great for light source 1 to illuminate the picture subject adequately, the resultant diaphragm setting will be larger than that possible, in accordance with the adjusted numerical index. Thereby, pin 11, through element 13, will open switch 5 so that there can be no energization of source 1 when shutter 4 is released, in the same manner as explained in connection with FIG. 1.

On the other hand, if indicator 20 is positioned in range 21 of adequate ambient illumination, lug 24a of yoke 24 will move inwardly past indicator 20 and will engage the free end of pivoted ring 28 to move this ring downward in the direction of arrow 29 and against the bias of spring 31. Thus, lug 28a is moved out of range of pin 27a of scanning element 27. Surface 24b of yoke 24 engages indicator 20 to clamp it against clamping surface 25 which is so arranged that its portion in the range of adequate ambient illumination, indicated at 21 in FIG. 3, is formed of dielectric or insulating material. Thus, conductors 23a and 23b are not interconnected. Under these circumstances, scanning element 27, upon its release just before the shutter is released, engages clamped indicator 20 and thus sets diaphragm 12 in accordance with the indicating position of indicator 20.

Figure 5:
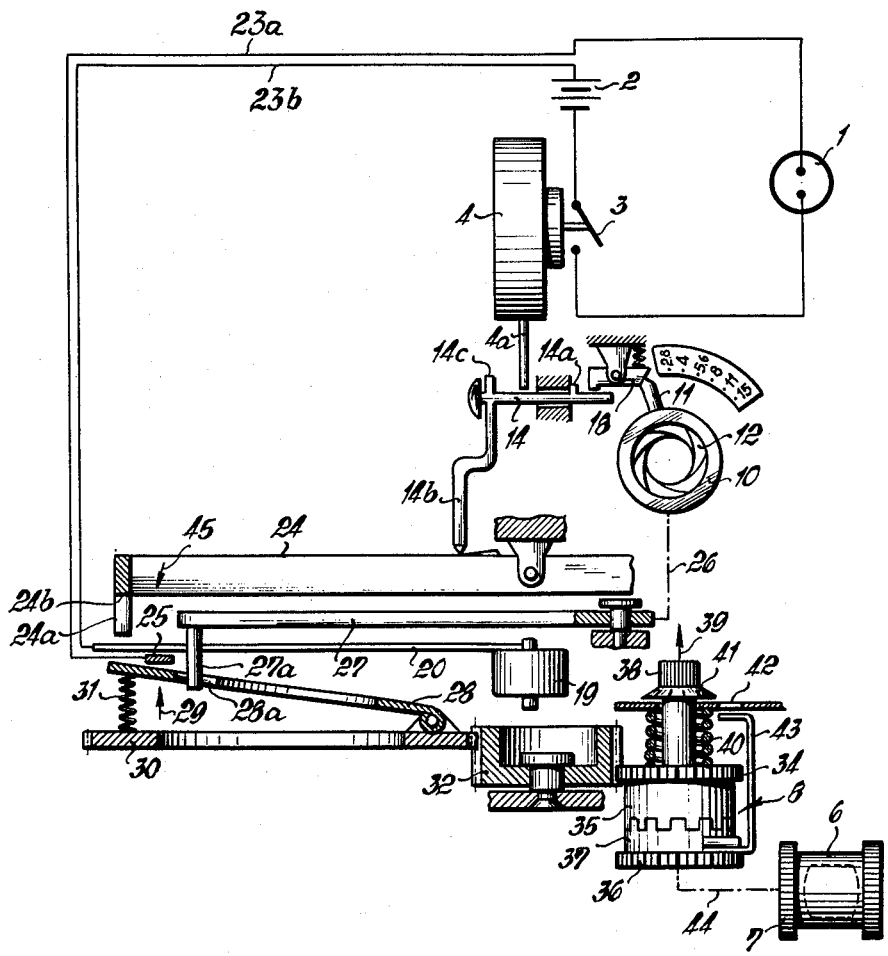
FIG. 5 is a view similar to FIG. 4 but corresponding to the controlling arrangement of FIG. 3.

FIG. 5 illustrates a practical embodiment of the arrangement shown somewhat schematically in FIG. 3. As the scanning mechanism is identical with that just described with reference to FIG. 4, it is believed that no further description thereof is necessary.

As distinguished from the arrangement shown in FIG. 4, shutter release key 14 is locked, as described in connection with FIGS. 2 and 3, in the event the picture subject is too far distant from the camera to be illuminated adequately by the auxiliary light source. The two conductors 23a and 23b are again included in the energizing circuit of the auxiliary light source, and clamping surface 25 is again electrically conductive in that portion corresponding to range 22, and of dielectric material in that portion corresponding to range 21. Shutter release key 14 operates yoke 24 by means of an extension or component 14b. When the picture subject is too distant for adequate illumination by auxiliary light source 1, pin 11 on diaphragm setting ring 10 swings pawl 18 counterclockwise to move the latter into the path of travel of lug 14a on the shutter release key. Release of the shutter normally is effected by a projection or lug 14c on key 14, this lug 14c engaging an operator 4a of the shutter release.

While specific embodiments of the invention have been shown and described in detail to illustrate the application of the principles of the invention, it will be understood that the invention may be embodied otherwise without departing from such principles.

What is claimed is:

1. A photographic camera comprising, in combination, a shutter; a shutter release; an auxiliary electric light source; a normally open energizing circuit for said light source including a source of potential; switch means in said energizing circuit controlling connection of said light source to said potential source; said shutter release controlling said switch means; an objective; range setting means for said objective; blocking means selectively operable to block actuation of said shutter release; and control means coupled to said range setting means and to said blocking means for controlling operation of said switch means, said control means, when said range setting means indicates a picture subject distance too great for adequate illumination of the picture subject by said light source, controlling said switch means through said blocking means and said shutter release means to maintain said energizing circuit open.

2. A photographic camera comprising, in combination, a shutter; a shutter release; a diaphragm; a diaphragm setter; an auxiliary electric light source; an energizing circuit for said light source including a source of potential; a normally open switch in said energizing circuit closed responsive to actuation of said shutter release to release said shutter; an objective; range setting means for said objective; selectively operable shutter release blocking means; control means coupled to said range setting means and to said diaphragm setter and operable to move said diaphragm setter to increase the diaphragm opening in accordance with said distance indication of said range setting means; said diaphragm setter being movable, in the diaphragm opening direction, a limited distance beyond the fully open position of said diaphragm; and an operator conditioning said blocking means to block operation of said shutter release, said operator being movable with said diaphragm setter and effective to block operation of said shutter release upon movement of said diaphragm setter to a position beyond the fully open position of said diaphragm.

3. A photographic camera, as claimed in claim 2, in which said blocking means comprises a pivoted locking lever adjacent said shutter release and normally biased to a position providing for free operation of said shutter release; said operator comprising a lug projecting from said diaphragm setter and engageable with said lever, upon movement of said diaphragm setter to a position beyond the fully open position of said diaphragm, to pivot said lever into blocking relation with said shutter release.

4. A photographic camera, as claimed in claim 3, in which the movement of said diaphragm setter beyond the fully open position of the diaphragm is of the order of one diaphragm degree.

5. A photographic camera, as claimed in claim 3, including an exposure meter having an indicator movable over a scale of ambient illumination values divided into a first range of ambient illumination values adequate for proper exposure and a second and succeeding range of ambient illumination values inadequate for proper exposure; and a second normally open switch in said energizing circuit in series with said first-named normally open switch and said light source and closed responsive to movement of said indicator into said second scale range.

References Cited by the Examiner
UNITED STATES PATENTS

| 3,023,665 | 3/62 | Estes | 95—10 |
| 3,072,028 | 1/63 | Lange | 95—10 |
| 3,073,226 | 1/63 | Greger | 95—10 |

EVON C. BLUNK, *Primary Examiner.*

D. B. LOWE, *Examiner.*